July 10, 1951 W. J. PADGETT 2,559,732
AIRPLANE ANCHOR SCREW KIT
Filed Feb. 13, 1948
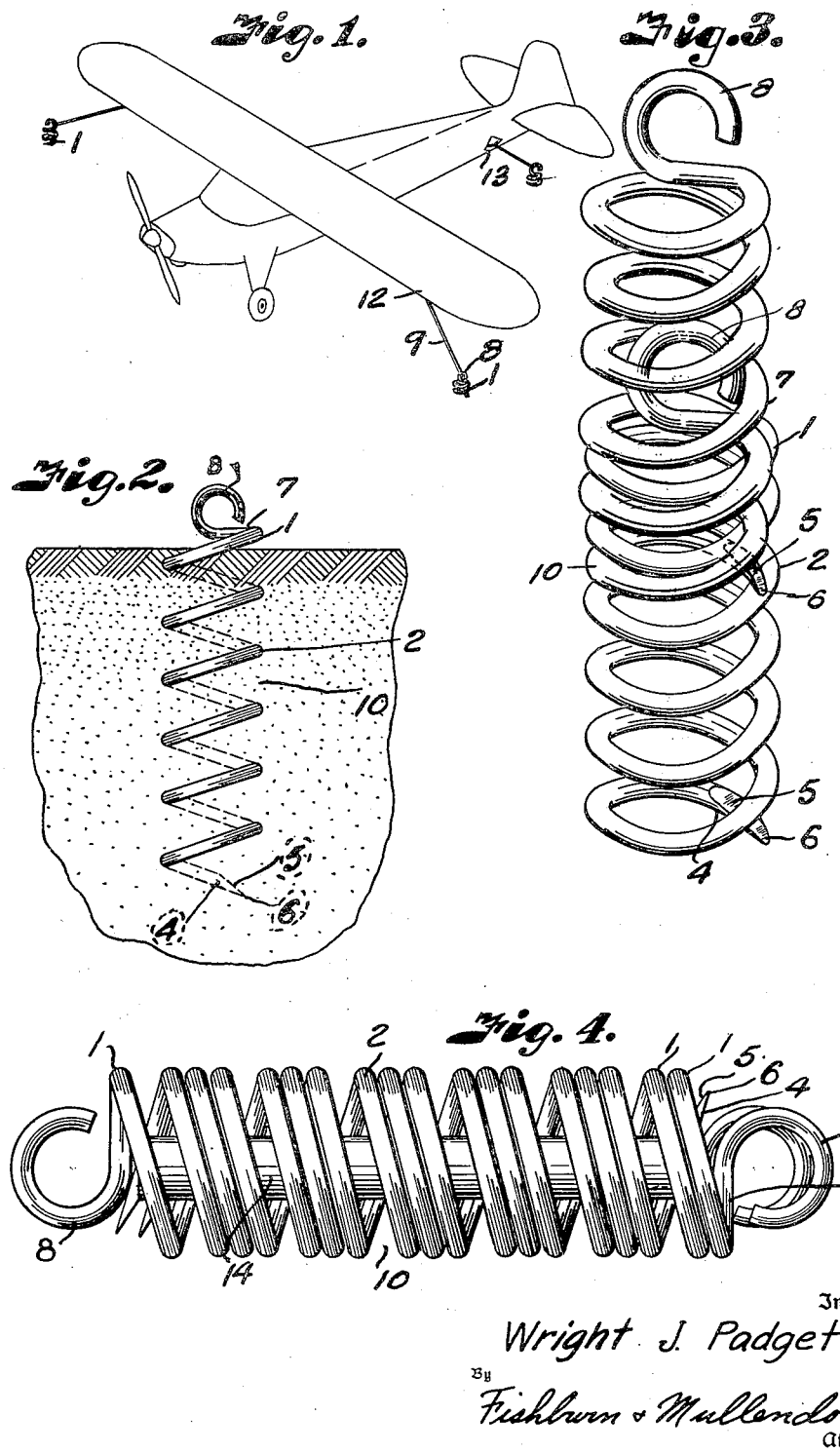
Inventor
Wright J. Padgett.
By Fishburn & Mullendore
Attorneys Patented July 10, 1951

2,559,732

UNITED STATES PATENT OFFICE 2,559,732

AIRPLANE ANCHOR SCREW KIT

Wright J. Padgett, Wichita, Kans.

Application February 13, 1948, Serial No. 8,113

2 Claims. (Cl. 206—46)

This invention relates to anchors for securing airplanes when leaving a plane in a field after making emergency landings or in fields where hangar facilities are not used or are not available.

The principal object of the invention is to provide a small, light-weight anchor kit which can be conveniently stored in an aircraft and does not materially add to weight of the equipment and which requires substantially little storage space.

Other objects of the invention are to provide an anchor of spiral form that can be easily turned into the ground with the aid of a stick or bar which forms a part of the kit; to provide anchors that may be threaded together in compact relation; and to provide an anchor shaped whereby one of the anchors locks the others in compact coaxial relation with the turning stick housed within the coils of the anchor.

Another object of the invention is to provide an anchor which is resiliently constructed to take shock and prevent tearing loose of the rigging of the airplane to which the anchor is connected.

In accomplishing these and other objects of the invention hereinafter pointed out, I have provided improved structure, the preferred form of which is illustrated in the accompanying drawing, wherein:

Fig. 1 is a perspective view of an airplane secured by anchors constructed in accordance with the present invention.

Fig. 2 is an elevational view of one of the anchors as it appears when engaged in the ground.

Fig. 3 is a perspective view illustrating threading of two of the anchors together in assembling the kit.

Fig. 4 is a side elevational view of the completely assembled anchor kit particularly illustrating the compact relationship of the anchors and turning stick.

Referring more in detail to the drawings:

I designated an anchor constructed in accordance with the present invention and which is particularly adapted for securing an airplane to the ground when the airplane is landed in an open field during windy weather.

Each anchor comprises a spiral body 2 preferably formed of a rod having circular cross section and of a length to provide the desired length of anchor and the required number of coils to assure secure engagement of the anchor with the ground. One end of the rod 4 is cut diagonally of the axis to provide an inclined flattened face 5 having a chisel-like earth penetrating point 6. The opposite end of the rod is bent as at 7 diametrically across the axis of the spiral and then into loop or eye 8 in the diametrical plane of the bend 7 for attaching a cable 9 by which the anchor is secured to a part of the rigging of the airplane as in the usual manner of securing an airplane to the ground. The rod is spirally wound to provide the coils, the convolutions being spaced apart as at 10 to accommodate the coils of the other anchors used in a kit. For example, the usual kit may comprise three anchors, one for connection with the rigging of the respective wings 12 and the other for connection with the guy part of the tail portion 13 of the aircraft as shown in Fig. 1.

The anchors are positioned in a kit by first threading one of the anchors into another so that the coils of one anchor engage between the spaces 10 of the coils of another anchor, as shown in Fig. 3. A turning stick 14 is inserted within the coils after which the third anchor is turned into threaded relation with the pointed ends of the nested anchors so that the coils of the third anchor substantially lock the anchors in assembly with the turning stick 14 housed within the coils of the anchors as shown in Fig. 4. When thus assembled the kit is of compact size and requires little storage space in the aircraft.

In carrying out the invention, the anchors are formed of one of the light-weight metals so as to eliminate excess weight and maintain the weight thereof at a minimum for storage within the airplane between periods of use. The material of the anchors is also of slightly springlike character and suitably tempered so that the coils have sufficient resiliency to act as snubbers in absorbing shocks and prevent pulling loose of the airplane rigging to which the cables 9 are attached.

To use the anchors, the key anchor of the kit is unthreaded from the nested anchors after which the two remaining anchors are readily unthreaded to release the turning stick.

In applying the anchors, the foot is placed on the flattened face 5 and the turning stick 14 is passed through the eye 8 so that when the anchor is rotated the pointed end 6 of the screw penetrates the ground and the anchor is drawn into the soil as shown in Fig. 3. The anchor may be engaged any suitable distance in the ground to secure a firm connection; however, the eye portion 8 is left protruding to attach the anchoring cables 9. When an airplane is thus anchored, it is securely retained in position as the anchors will not readily pull from the ground.

The force of any gusts of wind acting on the anchored airplane are absorbed by the slightly resilient action of the coils of the anchors so as to prevent breaking of the anchoring cables or pulling loose of the rigging to which the cables are attached.

In removing the anchors the stick 14 is placed through the eye 8 and the anchors are reversely rotated so as to unthread them from the ground.

After removal of the anchors the anchors are assembled by placing two of them so that the coils of one turn within the spaces 10 between the coils of the other with the eyes 8 positioned as shown in Fig. 3. The turning stick is then applied within the coils after which the third anchor is threaded into engagement with the nested anchors by turning the third anchor relatively to the nested anchors so that the threads thread through the coils of the nested anchor as shown in Fig. 4. The completed assembly may be placed within a suitable bag (not shown) and stored within the aircraft.

From the foregoing it is obvious that I have provided an aircraft anchor which is of simple and inexpensive construction and which is of relatively light-weight and compact construction. It is also obvious that I have provided anchors which are readily packed in kit form so that they occupy a substantially small amount of space in the aircraft.

I claim:

1. An anchor kit composed of a plurality of separate helical anchoring members, each having spaced coils terminating at one end in an eye, two of said members being coaxially nested together with the eyes thereof in side to side relation and another of the members being turned reversely with the coils turned within the nested members to retain the members in coaxial compact assembly.

2. An anchor kit composed of a plurality of separate helical anchoring members, each having spaced coils terminating at one end in an eye, two of said members being coaxially nested together with the eyes thereof in side to side relation and another of the members being turned reversely with the coils turned within the nested members to retain the members in coaxial compact assembly, and a turning bar housed within said members.

WRIGHT J. PADGETT.

REFERENCES CITED

The following references are of record in the file of this patent:

UNITED STATES PATENTS

| Number | Name | Date |
|---|---|---|
| 781,221 | Morris | Jan. 31, 1905 |
| 832,565 | Wilson | Oct. 2, 1906 |
| 907,799 | Hawley | Dec. 29, 1908 |
| 1,009,029 | David | Nov. 14, 1911 |
| 1,635,923 | Bray | July 12, 1927 |
| 1,987,096 | Chance | Jan. 8, 1935 |
| 2,012,615 | Mason | Aug. 27, 1935 |